United States Patent [19]

Ohara et al.

[11] Patent Number: 5,508,378
[45] Date of Patent: Apr. 16, 1996

[54] METHOD FOR PRODUCING POLYLACTIC ACID

[75] Inventors: Hitomi Ohara; Seiji Sawa; Tatsushi Kawamoto, all of Kyoto, Japan

[73] Assignee: Shimadzu Corporation, Kyoto, Japan

[21] Appl. No.: 375,286

[22] Filed: Jan. 20, 1995

[30] Foreign Application Priority Data

Jan. 21, 1994 [JP] Japan ................................. 6-022165

[51] Int. Cl.$^6$ ............................................. C08G 63/08
[52] U.S. Cl. .................... 528/354; 525/408; 525/415; 525/450; 528/357; 528/361
[58] Field of Search ............................ 525/408, 415, 525/450; 528/354, 357, 361

[56] References Cited

U.S. PATENT DOCUMENTS

| | | | |
|---|---|---|---|
| 4,300,565 | 11/1981 | Rosensaff et al. | 528/354 |
| 5,010,145 | 4/1991 | Ikada et al. | 525/415 |
| 5,041,529 | 8/1991 | Shiwoda et al. | 528/354 |
| 5,278,256 | 1/1994 | Bellis | 525/450 |
| 5,357,034 | 10/1994 | Fridman et al. | 528/354 |

*Primary Examiner*—Shelley A. Dodson
*Attorney, Agent, or Firm*—Oblon, Spivak, McClelland, Maier & Neustadt

[57] ABSTRACT

A method for producing a polylactic acid of the present invention includes the steps of (a) polymerizing a lactide used as a main starting material in a molten state to give a polylactic acid; and (b) further polymerizing the polylactic acid obtained in step (a) in a solid phase by heating at a temperature lower than a melting point of a final polymer product.

14 Claims, No Drawings

METHOD FOR PRODUCING POLYLACTIC ACID

BACKGROUND OF THE INVENTION

1. Field of the Invention

The present invention relates to a method for producing a solid polylactic acid having a high molecular weight. The polylactic acid obtained by the method of the present invention has a high molecular weight, which may take various shapes such as granular, pelletized, and plate-like forms.

2. Discussion of the Related Art

A polylactic acid is a biologically very safe polymer, and its degradative product, namely lactic acid, is absorbed in vivo. Having the above properties, the polylactic acid is used for medical purposes, including surgical sutures, sustained-release capsules in drug delivery systems, and reinforcing materials for bone fractures. Moreover, it is noted as a degradable plastic, because it degrades under natural environmental conditions. It is also widely used for monoaxially and biaxially stretched films, fibers, extrusion products, and various other purposes.

The methods for producing a polylactic acid may be as follows: In one method, lactic acid is directly subject to dehydration condensation to give a desired product. In another method, a cyclic lactide used as a dimer, is first synthesized from lactic acids and then purified by such methods as crystallization, followed by ring-opening polymerization. Various procedures for synthesizing, purifying and polymerizing lactides are disclosed in U.S. Pat. No. 4,057,537, EP-A-261,572, *Polymer Bulletin*, 14, pp. 491–495 (1985), *Makromol. Chem.*, 187, 1611–1629 (1986), and other chemical literatures. Also, JP-B-56-14688 discloses a method for producing a polylactic acid comprising polymerizing a bimolecular cyclic diester, as an intermediate, using tin octylate or lauryl alcohol as a catalyst. The polylactic acid thus obtained is pelletized into various forms, such as spheres, cubes, columns, and disrupted pieces, in a size of from a rice grain to a bean, to facilitate its handling in the forming process.

However, the polylactic acid having a high molecular weight of from 100,000 to 500,000 has a high melting point of from 175°–200° C. Conventionally, when the final polymer product of the above polylactic acid is taken out from the reactor in a molten state and heated to a temperature higher than its melting point, the polylactic acid undergoes decomposition and coloration. Moreover, a large amount of lactides remain in the polymer by heating at the above temperature, presumably due to the fact that a polymer-lactide equilibrium is shifted toward the lactide side at the above temperature.

These lactides and decomposition products thereof are likely to sublime during injection molding or spinning of the polylactic acid pellets used as a starting material and undesirably adhere to dice or nozzles, and thereby the operation is hampered. Furthermore, the lactides and the decomposition products lower the glass transition temperature and the melt viscosity of the polymer, resulting in drastic deterioration of formability and thermal stability.

SUMMARY OF THE INVENTION

An object of the present invention is to provide a method for producing a polylactic acid having a high molecular weight free from coloration, which contains substantially no decomposition products or lactides, and has a desired shape appropriate to a final product.

As a result of intense research in view of the above problems, the present inventors have found that the polymerization reaction of the polylactic acid can be further progressed and the unreacted lactides can also be allowed to react with each other by further heating a formed, insufficiently polymerized polylactic acid at a temperature lower than the melting point of the polylactic acid without melting. Based upon this finding, the present invention has been developed.

The present invention is concerned with a method for producing a polylactic acid comprising the steps of (a) polymerizing a lactide used as a main starting material in a molten state to give a polylactic acid; and (b) further polymerizing the polylactic acid obtained in step (a) in a solid phase by heating at a temperature lower than a melting point of the final polymer product.

According to the method of the present invention, a formed, particularly pelletized, polylactic acid having a high molecular weight of 200,000 to 500,000 free from coloration and containing substantially no decomposition products can be obtained.

DETAILED DESCRIPTION OF THE INVENTION

The method for producing a polylactic acid comprises two steps, namely the first-step polymerization and the second-step polymerization. Specifically, in the first-step polymerization, a lactide used as a main starting material is polymerized in a molten state to give a polylactic acid, and in the second-step polymerization, the polylactic acid is further polymerized in a solid phase at a temperature lower than the melting point of the polylactic acid.

In the first-step polymerization in the present invention, the reaction is first carried out at a relatively low temperature in which decomposition or coloration does not take place. Thereafter, an obtained polylactic acid may be formed into a desired shape, for instance, pellets. The reaction temperature for the first-step polymerization is lower than a melting point of the polylactic acid, normally from 120°–190° C., preferably from 140°–170° C., and the obtained polylactic acid has an average molecular weight of from 50,000 to 200,000 and contains lactides therein in an amount of from 10 to 50% by weight. The viscosity of the polylactic acid obtained in the first-step polymerization is normally from 1,000 to 20,000 poise, preferably from 3,000 to 7,000 poise. The polylactic acid having the above properties can be easily formed into such shapes as pellets, and it does not show melt adhesion upon heating in the second-step polymerization.

With respect to catalysts used in the first-step polymerization, any one of conventionally known catalysts used in polymerization of lactic acids can be used, including tin compounds, such as tin octylate; titanium compounds, such as tetraisopropyl titanate; zirconium compounds, such as zirconium isopropoxide; and antimony compounds, such as antimony trioxide. Also, the molecular weight of the final polymer product in the second-step polymerization can be adjusted by the amount of catalyst added.

In the first-step polymerization, the catalyst may be added in two or more separate portions for the purpose of enhancing a catalytic effect in the second-step polymerization. In this case, the catalyst may be added at least in two separate portions, preferably from two to five separate portions. Particularly, the catalyst may be effectively added at least at the beginning and the end of the first-step polymerization. Here, the amount of the catalyst added for the first portion is from 5 to 100 ppm, preferably from 10 to 50 ppm.

Smaller the amount of catalyst used, higher the molecular weight of the polymer product, though the reaction rate decreases. Nucleating agents, such as talc, clay, and titanium oxide, may be optionally added.

The lactide used for the method of the present invention may be a D-, L-, or DL-isomer, or a mixture of D- and L-isomers. The above monomer can also be copolymerized with lactones, such as β-propiolactone, δ-valerolactone, ε-caprolactone glycolide, and δ-butyrolactone. Further, polyhydric alcohols, such as glycerol, may be used to control physical properties.

The polymerization reaction is carried out by heating the reaction mixture comprising lactides for 0.5 to 5 hours using a catalyst in an amount of normally from 0.0001 to 0.1% by weight, preferably from 0.001 to 0.05% by weight, based on the lactide. The reaction is preferably carried out in an atmosphere or stream of an inert gas, such as a nitrogen gas.

The polylactic acid obtained by the method explained above may be formed into a desired shape, such as granular and pelletized forms, using a forming machine. The formed polylactic acid is then further heated using a heater, such as a drier, to proceed the second-step polymerization, while maintaining its shape. When shifting to the second-step polymerization, the polylactic acid may be cooled to a temperature lower than the crystallization temperature of the polymer to crystallize and then rapidly heated to a temperature of the second-step polymerization. The second-step polymerization is carried out in a solid phase.

The temperature of the second-step polymerization is desirably set at a temperature not lower than the melting point of the lactide and lower than the first-step polymerization temperature by 5° C. or more, preferably by 10° C. or more, and lower than the melting point of the final polymer product. The second-step reaction temperature is, therefore, normally from 100°–175° C., preferably from 120°–140° C. By thus setting the temperature, the melt adhesion of the solid polymer obtained in the first-step polymerization can be inhibited in the second-step polymerization. The reaction time is normally from 6 to 90 hours, preferably from 20 to 40 hours. Further, in order to shorten the reaction time, the reaction temperature may be raised with the progress of the second-step polymerization. Because the melting point of the final polymer product is from 170°–180° C., the reaction temperature can be increased up to a temperature near 175° C. In order to inhibit the sublimation of the unreacted lactide, the reaction may be carried out while pressing the reaction mixture under a pressure higher than atmospheric pressure, more specifically at a pressure of from 0.1 to 10 kgf/cm$^2$ (gauge pressure), preferably from 1 to 3 kgf/cm$^2$.

For the purpose of effectively inhibiting melt adhesion, the second-step polymerization may be carried out in a solvent. Examples of the solvents used in the present invention may be known solvents as long as they do not contain a hydroxyl group, a carboxyl group, an ester group, a thiol group, and an —SH group, each of which are reactive to the lactide. Specific examples thereof include aromatic hydrocarbons, such as toluene, xylene, and benzene; and paraffin-type aliphatic hydrocarbons such as hexane. The solvent is used in an amount of normally from 0.5 to 10 times the amount, by weight, preferably from 1 to 3 times the amount, by weight, of the polylactic acid pellets.

In the polymerization reaction in the present invention, the second-step polymerization may be started before the temperature of the polylactic acid lowers. Alternatively, the second-step polymerization may be started after cooling and crystallizing the polylactic acid in the first-step polymerization. A catalyst may be further added just before starting the second-step polymerization.

In addition, conventionally known additives, including stabilizers, such as calcium stearate; plasticizers, such as phthalic acid ester; and coloring agents, such as chromium orange and titanium oxide may be supplemented to the polylactic acid.

The polylactic acid produced by the above-described method has a molecular weight of from 100,000 to 500,000, preferably from 200,000 to 500,000.

Since a lactide is a crystal at room temperature having a melting point of from 90°–98° C., when a polymerization reaction is carried out at temperatures not lower than the melting point of the polylactic acid, polymers having molecular weights of 200,000 or higher are obtainable. Therefore, since the obtained polymer has a melting point of from 170°–180° C., higher than the polymerization temperature, polymerization presumably proceeds in a solid (more precisely, a solid solution) after a certain time point. The second-step polymerization serves to increase the length of the polymer chain formed in the first-step polymerization and to allow unreacted lactide molecules to react with each other.

EXAMPLES

The present invention will be further described by means of the following working examples, without intending to restrict the scope of the present invention thereto.

GPC, DSC, and viscosity in each of Examples are measured under the following conditions:

GPC
  Detector: RID-6A
  Pump: LC-9A
  Column oven: CTO-6A
  Columns: Connecting in series: SHIM PACK GPC-801C, GPC-804C, GPC-806C, and GPC-8025C.
  Here, the detector, the pump, the column oven, and the columns are all manufactured by Shimadzu Corporation.
  Analysis conditions:
  Solvent: Chloroform
  Flow rate: 1 ml/min
  Amount of sample: 200 μl (dissolving concentration of 0.5% by weight in chloroform.)
  Column temp.: 40° C.
DSC
  DSC-50 (manufactured by Shimadzu Corporation)
  Temperature rising rate: 10° C./min
  Amount of sample: 6 to 7 mg
Viscosity
  B8L-HM (manufactured by TOKIMECH K.K.)

EXAMPLE 1

First-step Polymerization

A catalyst (tin octylate) is added in an amount of 0.01% by weight to 100 g of L-lactide (manufactured by Purac). The L-lactide mixture is placed in a beaker, and an internal air is replaced with an N$_2$ gas. Thereafter, the beaker is immersed in an oil bath to heat the mixture at a temperature of 135° C. for 40 minutes. The reaction time is measured after all L-lactides are melted and the set temperature is reached. Polymerization is continued until a viscosity is sufficiently high, while adjusting an oil bath set temperature so as not to overheat the mixture by the heat of reaction. Although the obtained polylactic acid has an average molecular weight of 125,000, a considerable amount of lactide remains in the reaction product. The viscosity of the reaction mixture is 100 poise.

Second-step Polymerization

The obtained polylactic acid is formed into pellets of a size of a rice grain. The formed polylactic acid is transferred in a thermostat, and a polymerization reaction is carried out at 115° C. for 15 hours. Neither melt adhesion nor coloration of the pellets is observed. All lactides are allowed to react with one another completely. The molecular weight analysis by GPC reveals that the obtained polylactic acid has an average molecular weight of 300,000.

EXAMPLE 2

First-step Polymerization

A catalyst (tin octylate) is added in an amount of 0.1% by weight to 65 g of L-lactide (manufactured by Purac). The L-lactide mixture is placed in a beaker, and an internal air is replaced with an $N_2$ gas. Thereafter, the beaker is immersed in an oil bath to heat the mixture at a temperature of 140° C. for 10 minutes. The reaction time is measured after all L-lactides are melted and the set temperature is reached. Polymerization is continued until a viscosity is sufficiently high, while adjusting an oil bath set temperature so as not to overheat the mixture by the heat of reaction. The obtained polylactic acid has an average molecular weight of 80,000, and the viscosity of the reaction mixture is 80 poise.

Second-step Polymerization

The obtained polylactic acid is formed into pellets of a size of a rice grain. The formed polylactic acid is transferred in a thermostat, and a polymerization reaction is further carried out at 100° C. for 30 hours. Neither melt adhesion nor coloration of the pellets is observed. No unreacted lactides remain in the reaction product. The molecular weight analysis by GPC reveals that the obtained polylactic acid has an average molecular weight of 205,000.

EXAMPLE 3

First-step Polymerization

A catalyst (tin octylate) is added in an amount of 0.001% by weight to 300 g of L-lactide (manufactured by Purac). The L-lactide mixture is placed in a 500-ml separable glass flask, and an internal air is replaced with an $N_2$ gas. Thereafter, the flask is placed in a mantle heater to heat the mixture at a temperature of 180° C. The mixture is stirred at 60 rpm and allowed to react with one other at 180° C. for 65 minutes. At this time, the viscosity of the reaction mixture is 450 poise. The obtained mixture is transferred in a stainless steel container and kept standing and cooled to room temperature. The molecular weight analysis by GPC reveals that the obtained polylactic acid has an average molecular weight of 120,000, and the amount of the unreacted lactide is 56.6% by weight.

Second-step Polymerization

The mixture obtained in the first-step polymerization is then roughly pulverized to a size of a bean using a hammer, and the pulverized mixture is placed in a stainless steel sealed container. After pressing with a nitrogen gas at a pressure of 1 kgf/cm$^2$, the container is transferred in a thermostat set at 110° C., and a reaction is carried out at 110° C. in a solid phase for 50 hours. After the reaction is terminated, the polylactic acid has an average molecular weight of 140,000 without causing any melt adhesion of the pulverized mixture. Also, the final polylactic acid product does not contain any unreacted lactides, and the glass transition temperature of the product determined by DSC is 60.2° C. Also, coloration does not take place in the product, and the product contains substantially no decomposition products thereof. Further, a weight reduction due to the sublimation of the lactide does not take place.

EXAMPLE 4

First-step Polymerization

A catalyst (tin octylate) is added in an amount of 0.001% by weight to 300 g of L-lactide (manufactured by Purac). The L-lactide mixture is placed in a 500-ml separable glass flask, and an internal air is replaced with an $N_2$ gas. Thereafter, the flask is placed in a mantle heater to heat the mixture at a temperature of 180° C. The mixture is stirred at 60 rpm and allowed to react at 180° C. with one other for 65 minutes. At this time, the viscosity of the reaction mixture is 450 poise. The obtained mixture is transferred in a stainless steel container and kept standing and cooled to room temperature. The molecular weight analysis by GPC reveals that the obtained polylactic acid has an average molecular weight of 120,000, and the amount of the unreacted lactide is 56.6% by weight.

Second-step Polymerization

The mixture obtained in the first-step polymerization is then roughly pulverized to a size of a bean using a hammer, and the pulverized mixture is placed in a stainless steel sealed container. After pressing with air at a pressure of 1 kgf/cm2 without particularly replacing an internal air with a nitrogen gas, the container is transferred in a thermostat set at 110° C., and a reaction is carried out at 110° C. in a solid phase for 50 hours. After the reaction is terminated, the polylactic acid has an average molecular weight of 135,000 without causing any melt adhesion of the pulverized mixture. Also, the final polylactic acid product does not contain any unreacted lactides, and the glass transition temperature of the product determined by DSC is 62.1° C. Also, coloration does not take place in the product, and the product contains substantially no decomposition products thereof. Further, a weight reduction due to the sublimation of the lactide does not take place.

EXAMPLE 5

First-step Polymerization

A catalyst (tin octylate) is added in an amount of 0.005% by weight to 300 g of L-lactide (manufactured by Purac). The L-lactide mixture is placed in a 500-ml separable glass flask, and an internal air is replaced with an $N_2$ gas. Thereafter, the flask is placed in a mantle heater to heat the mixture at a temperature of 170° C. The mixture is stirred at 60 rpm and allowed to react with one other at 170° C. for 135 minutes. At this time, the viscosity of the reaction mixture is 650 poise. The obtained mixture is transferred in a stainless steel container and kept standing and cooled to room temperature. The molecular weight analysis by GPC reveals that the obtained polylactic acid has an average molecular weight of 153,000, and the amount of the unreacted lactide is 30.9% by weight.

Second-step Polymerization

The mixture obtained in the first-step polymerization is then roughly pulverized to a size of a bean using a hammer, and the bean-sized mixture is placed in a stainless steel sealed container. An internal air is not particularly replaced with a nitrogen gas, the container is transferred in a thermostat set at 110° C. A reaction is carried out in a solid phase at 110° C. for 20 hours, then at 140° C. for 5 hours, and further at 170° C. for 5 hours. After the reaction is terminated, the polylactic acid has an average molecular weight of 160,000 without causing any melt adhesion of the pulverized mixture. Also, the final polylactic acid product does not contain any unreacted lactides, and the glass transition temperature of the product determined by DSC is 62.1° C. Also, coloration does not take place in the product, and the product contains substantially no decomposition products thereof. Further, a weight reduction due to the sublimation of the lactide does not take place.

EXAMPLE 6

First-step Polymerization

A catalyst (tin octylate) is added in an amount of 0.002% by weight to 300 g of L-lactide (manufactured by Purac). The L-lactide mixture is placed in a 500-ml separable glass flask. After pressing with an $N_2$ gas at 2 $kgf/cm^2$, the flask is placed in a mantle heater to heat the mixture at a temperature of 170° C. The mixture is stirred at 60 rpm and allowed to react with one another at 170° C. for 60 minutes. At this time, the viscosity of the reaction mixture is 100 poise. The obtained mixture is drawn by a glass syringe previously heated to 120° C. and then pushed out in a glass container previously heated to 120° C. to form the mixture into a strand-like shape. The molecular weight analysis by GPC reveals that the obtained polylactic acid has an average molecular weight of 75,000, and the amount of the unreacted lactide is 50.6% by weight.

Second-step Polymerization

After replacing with a nitrogen gas, the glass container is quickly transferred in a thermostat set at 120° C. while maintaining the temperature of the sample at a temperature higher than 120° C. The mixture is allowed to react with one another at 120° C. for 20 hours, then at 140° C. for 5 hours, and further at 160° C. for 5 hours in a solid phase. After the reaction is terminated, the polylactic acid has an average molecular weight of 70,000 without causing any melt adhesion of the mixture having a strand-like form. Also, the final polylactic acid product does not contain any unreacted lactides, and the glass transition temperature of the product determined by DSC is 57.3° C. Also, coloration does not take place in the product, and the product contains substantially no decomposition products thereof. Further, a weight reduction due to the sublimation of the lactide does not take place.

EXAMPLE 7

First-step Polymerization

A catalyst (tin octylate) is added in an amount of 0.001% by weight to 300 g of L-lactide (manufactured by Purac). The L-lactide mixture is placed in a 500-ml separable glass flask, and an internal air is replaced with an $N_2$ gas. Thereafter, the flask is placed in a mantle heater to heat the mixture at a temperature of 180° C. The mixture is stirred at 60 rpm and allowed to react with one other at 180° C. for 65 minutes. At this time, the viscosity of the reaction mixture is 450 poise. The obtained mixture is transferred in a stainless steel container and kept standing and cooled to room temperature. The molecular weight analysis by GPC reveals that the obtained polylactic acid has an average molecular weight of 120,000, and the amount of the unreacted lactide is 56.6% by weight.

Second-step Polymerization

The mixture obtained in the first-step polymerization is then roughly pulverized to a size of a bean using a hammer, and the pulverized mixture is placed in a stainless steel sealed container. After pressing with a nitrogen gas at a pressure of 0.7 kgf/cm2, the container is transferred in a thermostat set at 110° C., and a reaction is carried out at 110° C. in a solid phase for 50 hours. After the reaction is terminated, the polylactic acid has an average molecular weight of 140,000 without causing any melt adhesion of the pulverized mixture. Also, the final polylactic acid product does not contain any unreacted lactides, and the glass transition temperature of the product determined by DSC is 63.3° C. Also, coloration does not take place in the product, and the product contains substantially no decomposition products thereof.

EXAMPLE 8

First-step Polymerization

A catalyst (tin octylate) is added in an amount of 0.001% by weight to 1,000 g of L-lactide (manufactured by Purac). The L-lactide mixture is placed in a twin-screw extruder ("KEX-30," manufactured by Kabushiki Kaisha Kurimoto Tekkosho). The mixture is heated to 180° C. and allowed to react at 180° C. with one other for 5 hours. The reaction mixture is taken out in a strand-like form, and the product is pelletized using a pelletizer. At this time, the molecular weight analysis by GPC reveals that the obtained polylactic acid has an average molecular weight of 400,000, and the amount of the unreacted lactide is 5% by weight. At this time, the viscosity of the reaction mixture is 10,000 poise.

Second-step Polymerization

The sample obtained in the first-step polymerization is transferred in a stainless steel sealed container. After pressing with an $N_2$ gas at a pressure of 7 $kgf/cm^2$, the container is transferred in a thermostat set at 120° C. A reaction is carried out in a solid phase at 120° C. for 20 hours, then at 140° C. for 5 hours, and further at 160° C. for 5 hours. After the reaction is terminated, the polylactic acid has an average molecular weight of 430,000 without causing any melt adhesion of the pelletized mixture. Also, the final polylactic acid product does not contain any unreacted lactides, and the glass transition temperature of the product determined by DSC is 64.0° C. Also, coloration does not take place in the product, and the product contains substantially no decomposition products thereof.

EXAMPLE 9

First-step Polymerization

A catalyst (tin octylate) is added in an amount of 0.1% by weight to 100 g of L-lactide (manufactured by Purac). The L-lactide mixture is placed in a beaker, and an internal air is replaced with an $N_2$ gas. Thereafter, the beaker is immersed in an oil bath to heat the mixture at a temperature of 135° C. for 40 minutes. The reaction time is measured after all L-lactides are melted and the set temperature is reached. Polymerization is continued until a viscosity is sufficiently high, while adjusting an oil bath set temperature so as not to overheat the mixture by the heat of reaction. Although the obtained polylactic acid has an average molecular weight of 125,000, a considerable amount of lactide remains in the reaction product. The viscosity of the reaction mixture is 100 poise.

Second-step Polymerization

Pellets having a molecular weight of 125,000 pelletized after the first-step polymerization are added in an amount of 500 g to 100 ml of toluene. A reaction is carried out at 105° C. for 15 hours. As a result, polylactic acid pellets having a molecular weight of 500,000 which are free from coloration and have substantially no low-molecular components can be obtained.

EXAMPLE 10

First-step Polymerization

A catalyst (tin octylate) is added in an amount of 0.001% by weight to 300 g of L-lactide (manufactured by Purac). The L-lactide mixture is placed in a 500-ml separable glass flask, and an internal air is replaced with an $N_2$ gas. Thereafter, the flask is placed in a mantle heater to heat the mixture at a temperature of 170° C. The mixture is stirred at 60 rpm and allowed to react with one other at 170° C. for 60 minutes. The obtained mixture is transferred in a stainless steel container and kept standing and cooled to room temperature. The molecular weight analysis by GPC reveals that the obtained polylactic acid has an average molecular weight of 140,000, and the amount of the unreacted lactide is 40% by weight.

Second-step Polymerization

The mixture obtained in the first-step polymerization is then roughly pulverized to a size of a bean using a hammer, and the pulverized mixture is placed in a stainless steel sealed container. After an internal air is replaced with a nitrogen gas, the container is transferred in a thermostat set at 110° C., and a reaction is carried out at 110° C. in a solid phase for 50 hours. After the reaction is terminated, the polylactic acid has an average molecular weight of 145,000 without causing any melt adhesion of the pulverized mixture. Also, the final polylactic acid product does not contain any unreacted lactides, and the glass transition temperature of the product determined by DSC is 60.2° C. Also, coloration does not take place in the product, and the product contains substantially no decomposition products thereof.

EXAMPLE 11

First-step Polymerization

A catalyst (tin octylate) is added in an amount of 0.001% by weight to 1,000 g of L-lactide (manufactured by Purac). The L-lactide mixture is placed in a twin-screw extruder. The mixture is heated to 180° C. and allowed to react at 180° C. with one other for 5 hours. The reaction mixture is taken out in a strand-like form, and the product is pelletized using a pelletizer. At that time, the molecular weight analysis by GPC reveals that the obtained polylactic acid has an average molecular weight of 390,000, and the amount of the unreacted lactide is 5% by weight.

Second-step Polymerization

The sample obtained in the first-step polymerization is transferred in a thermostat set at 140° C. A reaction is carried out in a solid phase at 140° C. for 20 hours, then at 140° C. for 5 hours, and further at 160° C. for 5 hours. After the reaction is terminated, the polylactic acid has an average molecular weight of 400,000 without causing any melt adhesion of the pelletized mixture. Also, the final polylactic acid product does not contain any unreacted lactides. Also, coloration does not take place in the product, and the product contains substantially no decomposition products thereof.

EXAMPLE 12

First-step Polymerization

A catalyst (tin octylate) is added in an amount of 0.001% by weight to 300 g of L-lactide (manufactured by Purac). The L-lactide mixture is placed in a 500-ml separable glass flask, and an internal air is replaced with an $N_2$ gas. Thereafter, the flask is placed in a mantle heater to heat the mixture at a temperature of 180° C. The mixture is stirred at 60 rpm and allowed to react with one other at 180° C. for 65 minutes. After the reaction, a catalyst (tin octylate) is further added in an amount of 0.001% by weight to the reaction mixture. Thereafter, the obtained mixture is stirred, then transferred in a stainless steel container, and kept standing and cooled to room temperature. The molecular weight analysis by GPC reveals that the obtained polylactic acid has an average molecular weight of 120,000, and the amount of the unreacted lactide is 56.6% by weight.

Second-step Polymerization

The mixture obtained in the first-step polymerization is then roughly pulverized to a size of a bean using a hammer, and the pulverized mixture is placed in a stainless steel sealed container. After an internal air is replaced with a nitrogen gas, the container is transferred in a thermostat set at 110° C., and a reaction is carried out at 110° C. in a solid phase for 50 hours. After the reaction is terminated, the polylactic acid has an average molecular weight of 140,000 without causing any melt adhesion of the pulverized mixture. Also, the final polylactic acid product does not contain any unreacted lactides, and the glass transition temperature of the product determined by DSC is 63.3° C. Also, coloration does not take place in the product, and the product contains substantially no decomposition products thereof.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for producing a polylactic acid comprising the steps of:
   (a) partially polymerizing a lactide used as a main starting material in a molten state to give a polylactic acid; and
   (b) further polymerizing the polylactic acid obtained in step (a) in a solid phase by heating at a temperature lower than a melting point of a final polymer product.

2. The method according to claim 1, further comprising forming the polylactic acid obtained in step (a) into a desired shape before step (b).

3. The method according to claim 1, wherein said temperature of step (a) is lower than a melting point of the polylactic acid.

4. The method according to claim 1, wherein said step (a) is carried out at a temperature of from 120°– 190° C., and wherein said step (b) is carried out at a temperature of from 100°–175° C.

5. The method according to claim 4, wherein said step (b) is carried out at a constant temperature or by raising or lowering the temperature of said polylactic acid within a temperature range of from 100°–175° C.

6. The method according to claim 1, wherein said step (b) is carried out under a pressure higher than atmospheric pressure.

7. The method according to claim 1, further comprising cooling and crystallizing the polylactic acid obtained in step (a) before step (b).

8. The method according to claim 1, wherein said step (b) is carried out in a non-reactive aromatic or aliphatic hydrocarbon solvent.

9. The method according to claim 1, wherein said step (a) includes the steps of adding a catalyst in two or more separate portions wherein the catalyst is selected from the group consisting of tin compounds, titanium compounds, zirconium compounds, and antimony compounds.

10. The method according to claim 9, wherein the catalyst is added at least at the beginning and the end of the polymerization in step (a).

11. A polylactic acid produced by the process comprising:
(a) partially polymerizing a lactide used as a main starting material in a molten state to give a polylactic acid; and
(b) further polymerizing the polylactic acid obtained in step (a) in a solid phase by heating at a temperature lower than a melting point of a final polymer product.

12. The polylactic acid according to claim 11, wherein the final polymer product in step (b) has an average molecular weight of from 100,000 to 500,000 as determined by GPC.

13. The method according to claim 8, wherein the solvent is present in an amount of 0.5 to 10 times the amount, by weight, of the polylactic acid.

14. The method according to claim 9, wherein the amount of the catalyst added in the first portion is from 5 to 100 ppm.

\* \* \* \* \*